United States Patent [19]

Shimoda et al.

[11] Patent Number: 5,006,045

[45] Date of Patent: Apr. 9, 1991

[54] SCROLL COMPRESSOR WITH REVERSE ROTATION SPEED LIMITER

[75] Inventors: Tatsuya Shimoda; Takeshi Seto; Kenichi Endo, all of Nagano; Yamaha Yoshikazu, Tokyo; Nobukazu Takagi, Saitama, all of Japan

[73] Assignees: Seiko Epson Corporation; Diesel Kiki Co., Ltd., both of Tokyo, Japan

[21] Appl. No.: 286,365

[22] Filed: Dec. 16, 1988

[51] Int. Cl.$^5$ .............................. F04B 49/00
[52] U.S. Cl. .................................. 417/42; 417/45; 417/410; 318/374; 318/758
[58] Field of Search .................. 417/410, 42, 45; 318/374, 375, 758

[56] References Cited

U.S. PATENT DOCUMENTS

| 4,558,077 | 12/1985 | Gray | 148/302 |
|---|---|---|---|
| 4,594,858 | 6/1986 | Shaw | 62/510 |
| 4,606,707 | 8/1986 | Kumata | 417/410 |
| 4,667,480 | 5/1987 | Bessler | 417/44 |
| 4,726,738 | 2/1988 | Nakamura et al. | 417/42 |
| 4,749,923 | 6/1988 | Chieng | 318/374 |
| 4,765,848 | 8/1988 | Mohri et al. | 148/302 |

FOREIGN PATENT DOCUMENTS

| 0108474 | 5/1984 | PCT Int'l Appl. | 148/302 |
|---|---|---|---|
| 0249973 | 12/1987 | PCT Int'l Appl. | 148/302 |

Primary Examiner—Leonard E. Smith
Assistant Examiner—David W. Scheuermann
Attorney, Agent, or Firm—Koda and Androlia

[57] ABSTRACT

Here is disclosed an air conditioner comprising a scroll type compressor and a brushless DC motor having a rotor provided with a permanent magnet and a stator provided with a sensor adapted to detect a relative position of said rotor and said stator. Here is additionally disclosed an air conditioner in which the rotor of the brushless DC motor comprises a permanent magnet basically made of rare earth elements inclusive of yttrium, transition metal and boron and a driving circuit for the motor includes a braking circuit adapted to excite coils of the motor to thereby reduce reverse rotation of the rotor.

5 Claims, 9 Drawing Sheets

SCROLL COMPRESSOR WITH REVERSE ROTATION SPEED LIMITER

BACKGROUND OF THE INVENTION

1. Field of the Invention

The present invention relates to an air conditioner equipped with a scroll type compressor and a brushless DC electromotor serving to drive said compressor.

2. Description of the Prior Art

The typical conventional air conditioner for control of the room temperature has usually employed the compressor of reciprocating type or rolling piston type as the compressor for coolant used in the refrigerating cycles and the induction motor as the electromotor to drive this compressor.

Figure 11:
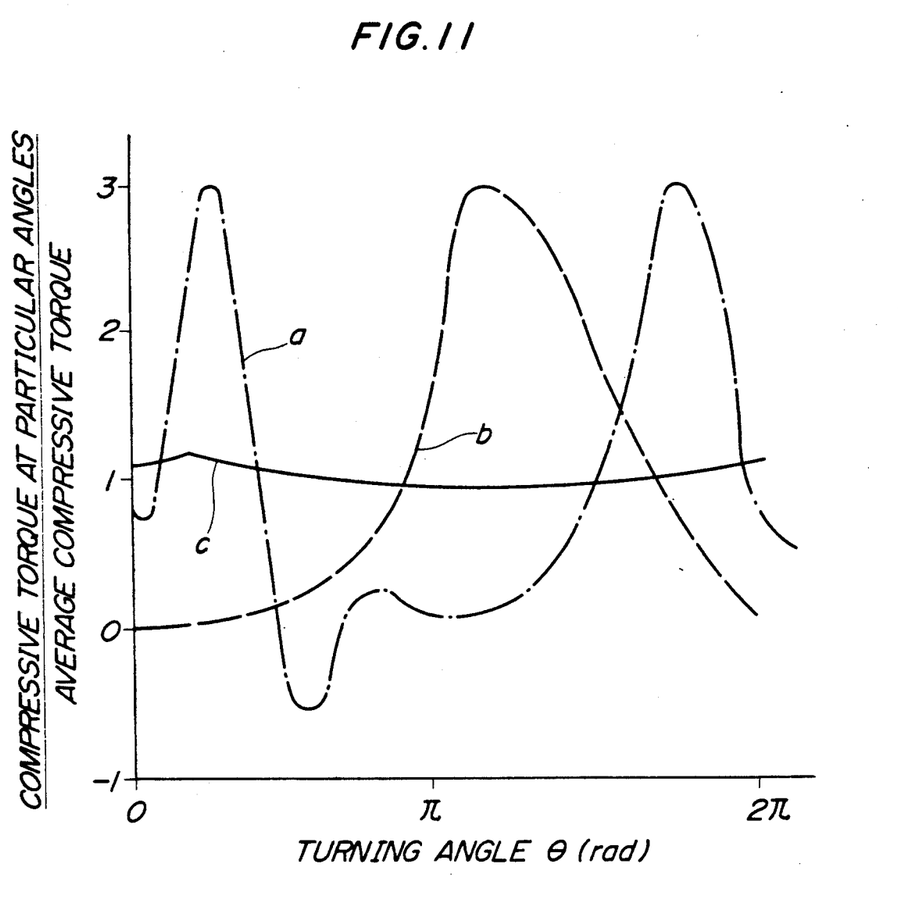

However, the compressor of reciprocating type or rolling piston type exhibits a large compressive torque variation with respect to the turning angle, as indicated by characteristic curves a, b in FIG. 11 of the accompanying drawing, so such compressor has had to be provided with a large inertia mass in order to smooth a driving torque. Note that the characteristic curve a corresponds to the reciprocating 2 cylinder tupe while the characteristic curve b corresponds to the rolling piston type. The compressors of both types have inevitably been subject to a significant efficiency reduction during a high velocity operation, since their constructions have necessarily resulted in relatively high sliding velocities of the respective sealing parts. In addition, a starting torque of the induction motor has usually been limited to a relatively low level and, to overcome this problem, there has been proposed the countermeasure such that, during a restarting of the compressor, the latter is forcibly braked for several minutes until a desired balance is established between the high pressure side and the low pressure side or a pressure balancing is achieved by use of a bypass valve. However, the forcible braking has disadvantageously deteriorated the controllability and use of the bypass valve has unacceptably increased the energy loss.

Thus, the enclosed motor compressor employing the scroll type compressor has recently been used in practice. This scroll type compressor comprises a plurality of compression chambers provided between a pair of scrolls adapted to be moved eccentrically with respect to each other and, as indicated by a characteristic curve c in FIG. 11, exhibits a compressive torque variation relative to the turning angle, which is substantially smaller than those in the compressors of other types, enabling a restarting of the compressor to be achieved by a relatively small motor torque. In this compressor, moreover, the compression cycles continuously occur and, therefore, a differential pressure between each pair of adjacent compression chambers is correspondingly reduced. This feature is advantageous in that a possible gas leakage during each compression cycle may be reduced and the compression efficiency may be improved by 10% or higher in comparison to the compressors of other types. Furthermore, the respective slidably movable parts locally perform only their orbital movement and the sliding velocities of the sealing parts are correspondingly reduced, making high velocity rotation and, therefore, miniaturization of the compressor possible.

This particular scroll type compressor of prior art is advantageous also in that compression of coolant can be achieved without provision of a non-return valve on the inlet side or the outlet side for coolant, because a plurality of independent compression chambers are defined between said inlet side and said outlet side for coolant and thereby a quantity of coolant is prevented from flowing backward. Nevertheless, after the compressor has ceased to be driven, a quantity of coolant flows reversely from the compression chambers of the outlet side towards the compression chambers on the inlet side under a high coolant pressure on the outlet side, causing the movable scroll member to be reversely rotated. As a result, the direction in which the stationary scroll member and the movable scroll member should be otherwise loaded varies and the locations at which these scroll members should wear are displaced from each other. This event may often provide undesirable effects, for example, produce noisy sound and deteriorate the durability.

In such case, it might be conceivable to lack the rotor of the induction motor directly coupled to the movable scroll member in an electrical manner and thereby to block the movable scroll member against its reverse rotation. However, the principle of driving peculiar to the induction motor in general makes it extremely difficult to lock the rotor of the induction motor in the electrical manner.

It is for this reason that the scroll type compressor of prior art has been provided on the inlet or outlet side (often on the outlet side) for coolant with a non-return valve to prevent the movable scroll member from being reversely rotated when the compressor is deenergized.

In spite of such countermeasure, the maximum in- and output efficiency of the electromotor is in order of 70%, since the conventional air conditioner comprises a combination of the scroll type compressor and the induction motor. With a consequence, the output torque of the electromotor is lower than that obtained from the electromotor utilizing a permanent magnet. To assure an adequate starting torque, it will be inconveniently necessary to employ a large-sized electromotor. As an additional inconvenience, the previously mentioned manner, i.e., forcible lock of the induction motor must be still relied to obtain a desired pressure balance for the restarting at the cost of the controllability. Furthermore, even if the scroll type compressor adapted to be rotatable at a high velocity is employed to decrease a discharge per each rotation and thereby to reduce both the volume and the weight of the compressor section, 80 to 90% of both the volume and the weight has usually been occupied by the electromotor section in the enclosed motor compressor and accordingly miniaturization of the compressor section by adoption of the scroll type compressor has not necessarily brought as immediate result on the compressor as a whole. Also with respect to the efficiency( it has been impossible to make the best of a high compression efficiency proper to the scroll type compressor and the motor efficiency has governed an efficiency of the entire cooling system.

Additionally, the scroll type compressor has required to be provided either on the inlet side or on the outlet side for coolant with a non-return valve, as has previously been mentioned, and such requirement has necessarily led to a problem that a coolant flow resistance is increased by the presence of said non-return valve and a volume efficiency is thereby decreased during a high velocity driving of the compressor, precluding a desired improvement of the compressor performance.

In view of these problems which have been encountered by the conventional air conditioner, the present invention has been made to solve them efficiently.

SUMMARY OF THE INVENTION

An essential object of the present invention is to provide an air conditioner equipped with a compressor including none of the non-return valve, which is high in its compression efficiency as well as in its velocity controllability and well adapted for rotation at a high velocity.

This object is achieved, in accordance with the present invention, by providing an air conditioner having a compressor and an electromotor directly coupled to a driving shaft of said compressor, wherein said compressor comprises a scroll type compressor; and said electromotor comprises a brushless DC motor including a rotor provided with a permanent magnet and a stator provided with a sensor adapted to detect a relative position of said rotor and said stator.

The present invention provides also an air conditioner having a compressor and a brushless DC motor directly coupled to a driving shaft of said compressor, wherein said compressor comprises a scroll type compressor; and a rotor of said brushless DC motor comprises a permanent magnet essentially composed of rare earth elements inclusive of yttrium, transition metal, and boron.

The present invention further provides an air conditioner having a scroll compressor and an electromotor directly coupled to a driving shaft of said compressor, wherein said electromotor comprises a brushless DC motor including a rotor provided with a permanent magnet; and a driving circuit for said motor includes a braking circuit adapted to excite coils of said motor and thereby to block said rotor against a reverse rotation.

Other features, objects and advantages of the invention will be readily apparent from reading the following description of preferred embodiments in reference with the accompanying drawing.

BRIEF DESCRIPTION OF THE DRAWINGS

FIGS. 1 through 5 illustrate a first embodiment of the present invention, wherein

FIGS. 6 and 7 illustrate a third embodiment of the present invention, wherein

FIGS. 9 and 10 illustrate a fifth embodiment of the present invention, wherein

FIG, and 11 is a graphic diagram plotting the turning angle versus the compressive torque in various compressors of prior art.

DETAILED DESCRIPTION OF PREFERRED EMBODIMENTS

FIGS. 1 through 5 illustrate a first embodiment of the present invention.

Figure 1:
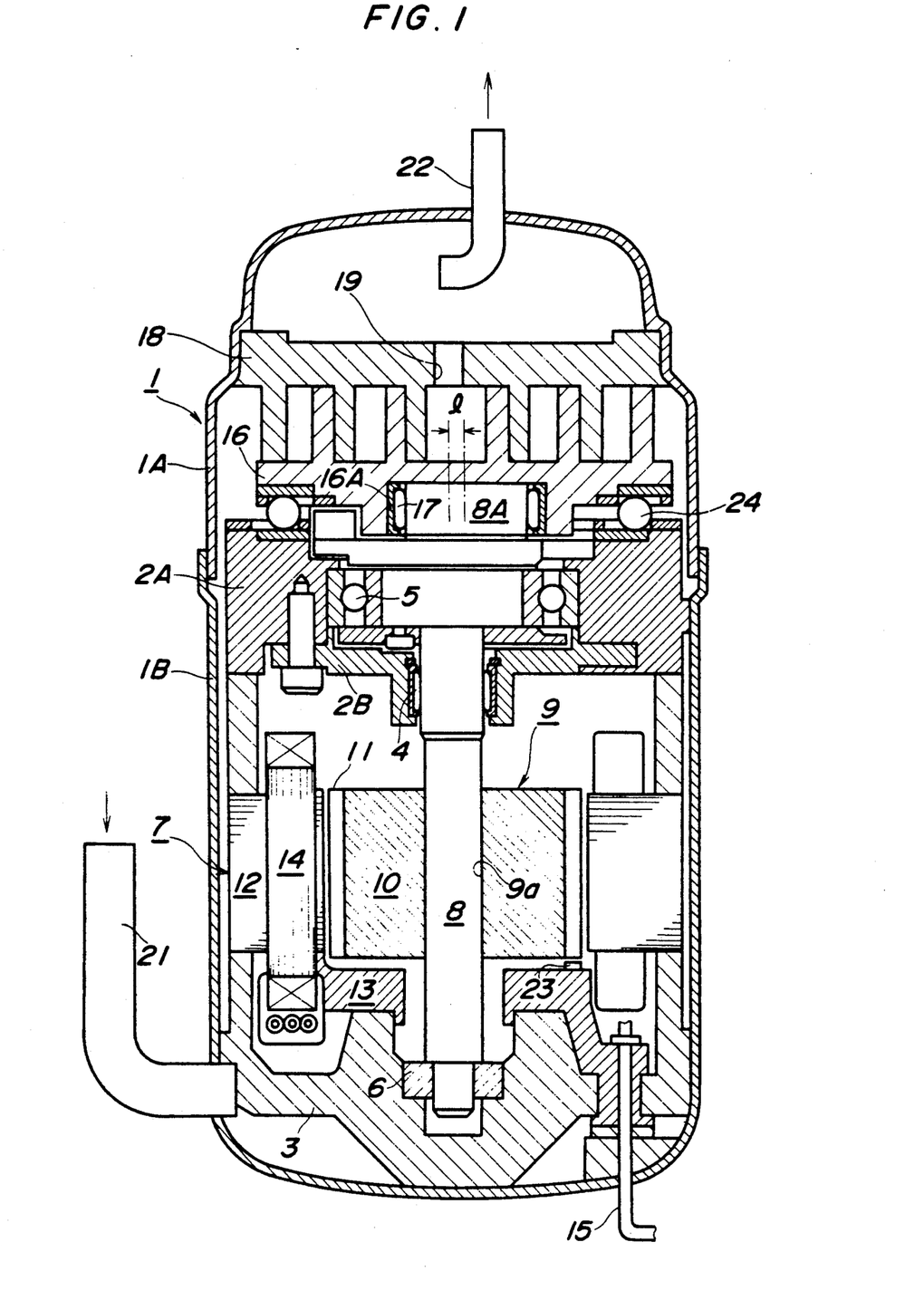
FIG. 1 is an axial section of a scroll type compressor.

Referring to FIG. 1, reference numeral 1 designates a compressor, 1A, 1B compression casings joined together in a sealed relationshiip, 2A, 2B upper bearing support members secured to the casing 1A. 3 is a lower bearing member secured to the casing 1B. A driving shaft 8 of an electromotor 7 is rotatably supported in the upper bearing support member 2A or 2B by a bearing 4 or 5 and in the lower bearing member 3 by a bearing 6.

A cylindrical rotor 9 is unrotatably mounted on the driving shaft 8 and this rotor 9 comprises a magnet carrying yoke 10 and permanent magnets 11 carried therearound so as to define N- and S-poles around the peripheral surface of said yoke 10. Around the permanent magnets 11, there is provided a cylindrical stator 12 comprising a laminated core and secured to the lower bearing support member 3. Said stator 12 is provided with a plurality of coils 14 so as to define a three phase magnetic field. The components as set forth above constitute together the brushless DC motor 7 and the coils 14 thereof are connected by lead wires 15 to a driving circuit 25 which will be described late more in detail, which serves to excite the coils 14.

An eccentric piece 8A which is eccentric with respect to the driving shaft 8 by a predetermined radial distance l is integrally joined to the upper end of said driving shaft 8 and said eccentric piece 8A is received within a coupling portion 16A of a movable scroll member 16 by a bearing 17 so that the movable scroll member 16 is driven as said eccentric piece 8A is rotated. The movable scroll member 16 is in engagement with a stationary scroll member 18 secured to the casing 1A and there are provided balls 24 between the rear side of the movable scroll member 16 and the upper bearing support member 2A so as to prevent the movable scroll member 16 from rotating around its own axis but to allow only an orbital movement of said movable scroll member 16. The movable scroll member 16 is slidably moved in accordance with an eccentricity between the stationary scroll member 18 and the driving shaft 8, progressively decreasing a volume of an enclosed small chamber defined by said engagement, thereby compressing a quantity of coolant, and discharges said quantity of coolant through an outlet 19 of the stationary scroll member 18. Reference numeral 21 designates a coolant inlet pipe and reference numeral 22 designates a coolant outlet pipe.

Opposed to the magnets 11 corresponding to the respective phases, said upper support member 13 carries Hall elements 23 by which the respective phase magnets 11 of the rotor 9 are position-detected and detection signals u, v, w for the respective magnets 11 are input to the driving circuit 25. These Hall elements 23 are free from any influence of contamination and other factors and able to perform a stabilized magnet position detection even within the enclosed motor in which a quantity of gas is mixed with lubricating oil. Based on the magnet position detection performed by these Hall elements 23 during rotation of the rotor 9, the latter is driven under a proper voltage control by the pulse rate modulation (pulse width modulation referred to hereinafter as PWM) and thereby the r.p.m. control can be easily achieved at a high efficiency.

The permanent magnets 11 of said rotor 9 comprise rare earth magnets of resin-binded type and was made in a manner as described below, in view of the requirements that they should be magnets of low cost and high performance.

A composition of rare earth metal (R) and transition metal (TM) such as

Sm(Co$_{bal}$ Cu$_{0.08}$ Fe$_{0.22}$ Zr$_{0.026}$)$_{8.35}'$

Sm$_{0.5}$ Ce$_{0.5}$ (Co$_{bal}$ Cu$_{0.1}$ Fe$_{0.2}$ Zr$_{0.02}$)$_{7.5}'$ and Sm (Co$_{bal}$ Cu$_{0.06}$ Fe$_{0.25}$ Zr$_{0.02}$)$_{7.6}$ was molten to obtain an alloy mass which was, in turn, subjected to a heat treatment suitable for magnetic hardening and then powdered by the ball mill method. Average particle size was from 5μm to 28μm. Preferable particle size distribution was from 5μm to 120μm. After thermosetting two-liquid epoxy resin of 2% by weight had been added as binder to said powder of 98% by weight, this mixture was compression-molded in a radial magnetic field into a cylindrical shape. After such molding, each magnet was subjected to a curing treatment and then bonded onto the magnet carrying yoke 10. The assembly thus obtained was used as the rotor 9. The magnets thus molded exhibited excellent magnetic performance as set forth in Table 1.

TABLE 1

| (BH)max(MGOe) | bHc(KOe) | Br(KG) |
|---|---|---|
| 15 | 6.8 | 8.3 |

Figure 2:
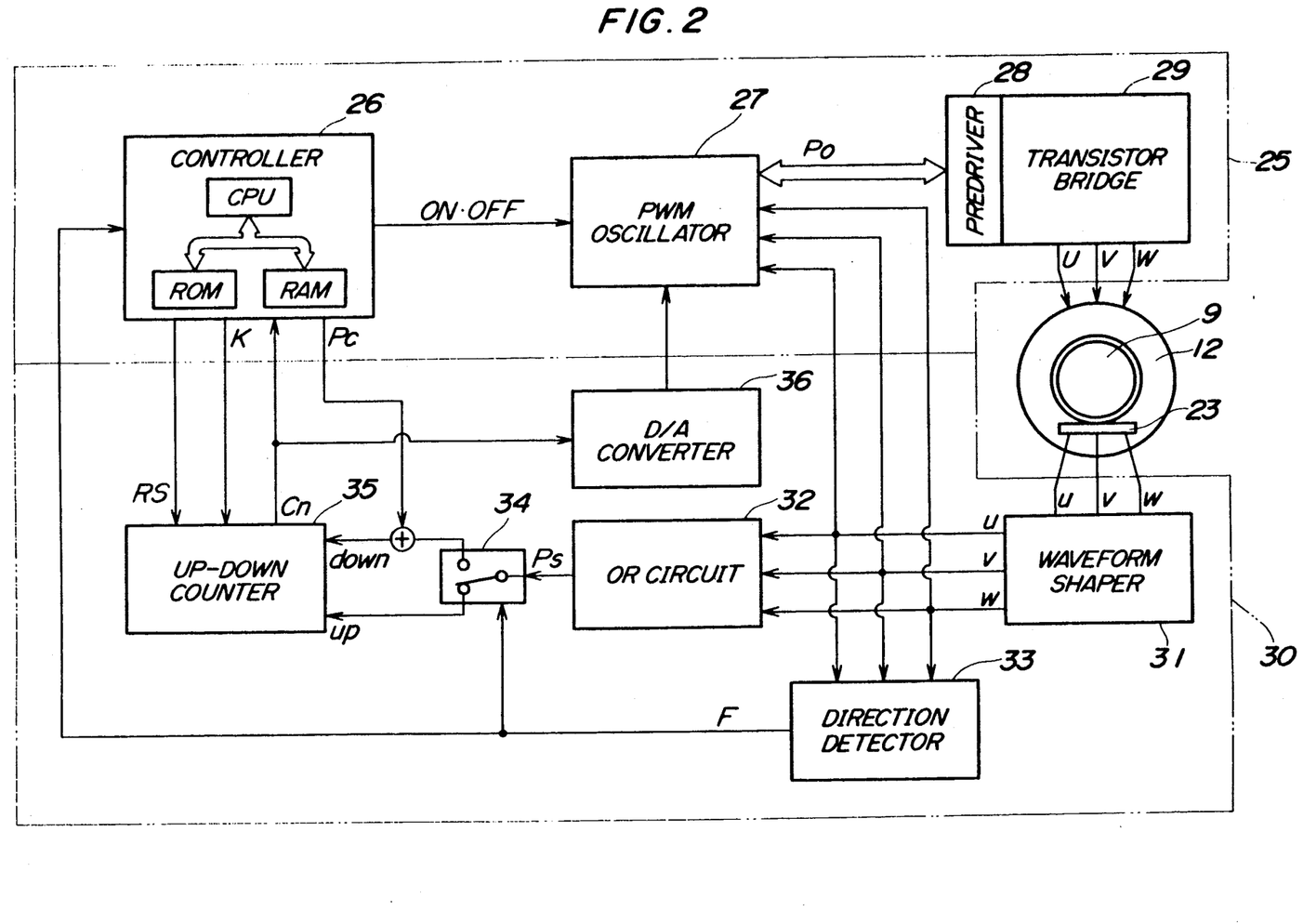
FIG. 2 is a block diagram illustrating a driving circuit and a braking circuit.

As shown in FIG. 2, said driving circuit 25 comprises a controller 26 adapted to control a PWM oscillator 27 when a driving start switch or a driving stop switch for the compressor is closed, a predriver 28 and a transistor bridge 29 adapted to produce three phase rotating field in the coils 14 of the electromotor 7 in response to a driving command signal Po (PWM signal) output from the PWM oscillator 27, and a braking circuit 30 serving to stop the rotor 9. The braking circuit 30 comprises a waveform shaper 31 used to shape the waveforms of the position detection signals u, v, w provided from the Hall elements 23 which serve together as the magnet position sensor, an OR circuit 32 adapted to convert the output pulse signals u, v, w of the respective phase produced by the waveform shaper 31 to a pulse train, a direction detector 33 to detect a rotational direction of the rotor on the basis of the output pulse signals u, v, w coming from the waveform shaper 31, a switching circuit 34 adapted to be switched by a rotational direction signal F provided from said direction detector 33, an up-down counter 35 to count the pulse train output from the OR circuit 32, and a D/A converter 36 adapted to D/A convert the count value Cn of said up-down counter 35 and thereby to control the pulse width of the command signal Po provided from the PWM oscillator 27.

Driving of the compressor 1 constructed as has been mentioned above is started in a manner as will be described. Upon closure of the driving start switch, the controller 26 controls the PWM oscillator 27 so as to output the driving command signal Po in response to which the predriver 28 and the transistor bridge 29 begin to supply the coils 14 of the stator 12 with DC exciting currents U, V, W of three phases so as to produce the corresponding rotating fields, thus rotating the rotor 9 and thereby driving the compressor 1.

Driving of this compressor 1 is stopped in a manner as will be described. Upon closure of the driving stop switch, the controller 26 controls the PWM oscillator 27 to output the driving stop signal Po in response to which the respective coils 14 cases to be supplied with said respective phase currents U, V, W and thus the rotor 9 is stopped.

Immediately after the compressor 1 has ceased to be driven, the rotor 9 together with the movable scroll member 16 tend to be reversely rotated by a high coolant pressure developed on the outlet side. To avoid this, the braking circuit 30 controls the rotor 9 to be effectively braked as shown by the flow chart of FIG. 3.

Figure 3:
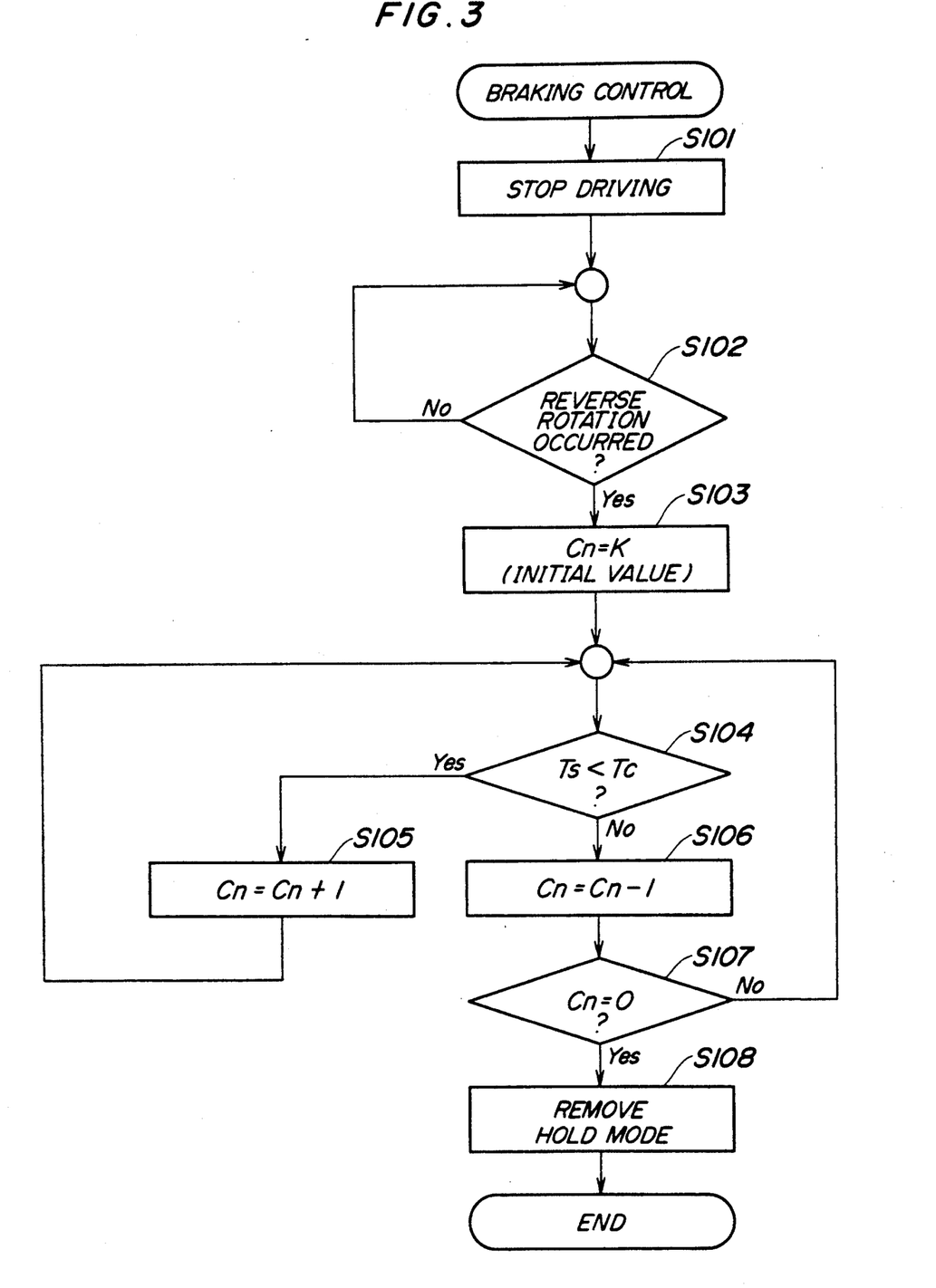
FIG. 3 is a flow chart schematically illustrating how to control braking of an electromotor.

Specifically, after the compressor has ceased to be driven (S101), the direction detector 33 determines on the basis of the pulse signals u, v, w of the respective phases whether a reverse rotation occurs or not (S102). If it is determined that the reverse rotation occurs, the rotational direction signal F controls the switching circuit 34 to be connected to the (up) side of the up-down counter 35 so that the count value Cn thereof is set to an initial value K (S103). Then the controller 26 drives the PWM oscillator 27 and the pulse width of the PWM oscillator 27 is controlled by the D/A converter 36 based on the count value Cn. The coils 14 are thereby supplied with the current of a magnitude corresponding to said count value Cn and excited so that a turning moment of positive direction is developed between the coils 14 and the permanent magnets 11 as a part of the rotor 9. Thus, the desired braking is achieved.

In this case, the controller 26 applies pulses Pc at regular pulse intervals Tc to the (down) side of the up-down counter 35 and it is determined whether a pulse interval Ts of the pulses Ps applied from the OR circuit 32 to the (up) side of the up-down counter 35 is smaller than said pulse interval Tc of said pulses Pc or not (S104).

If Ts<Tc, it is determined that the rotor 9 is reversely rotating at a velocity higher than the set value and a further higher exciting current is necessary for effective braking. Based on this determination, the counter value is increased by 1 through an operational addition, i.e., Cn=Cn+1 performed in the up-down counter 35 (S105) and a higher exciting current corresponding to this new count value is used to brake the rotor 9. Such control based on said new count value continues until a relationship of Ts>Tc is established. In this manner, it is effectively avoided that an excessive current might cause the rotor 9 to be rotated in the positive direction and said excessive current might cause a heat generation in the coils, because the exciting current can be controlled with a progressive addition of the count value.

If not Ts<Tc, it is suggested that the acceleration for reverse rotation of the rotor 9 has been progressively reduced under an effective braking control. Based on such determination, an operational subtraction, i.e., Cn=Cn-1 is performed in the up-down counter 35 (S106) and a braking control is effected by the exciting current corresponding to a new count value thus obtained as a result of said subtraction. Such braking control is repeated according to every subtracting processing until the count value Cn=0 is reached (S107).

When the count value Cn=0 has been reached (S107), a pressure within the compressor 1 is balanced, namely, the rotor 9 is no more rotated. In a consequence, the rotor 9 is released from its HOLD mode (S108) and the braking control is completed.

Should the rotor 9 begins to be rotated in the positive direction during the braking control for some cause, such rotation of positive direction is detected by the direction detector 33 which outputs, in turn, the rotational direction signal F with which the switching circuit 34 is changed over from the (up) side to the (down) side and the up-down counter 35 performs an appropriate subtraction processing. as a result, the exciting current flowing the coils 14 decreases and thereby the uncontrollable operation of the motor 7 is avoided.

Figure 12:
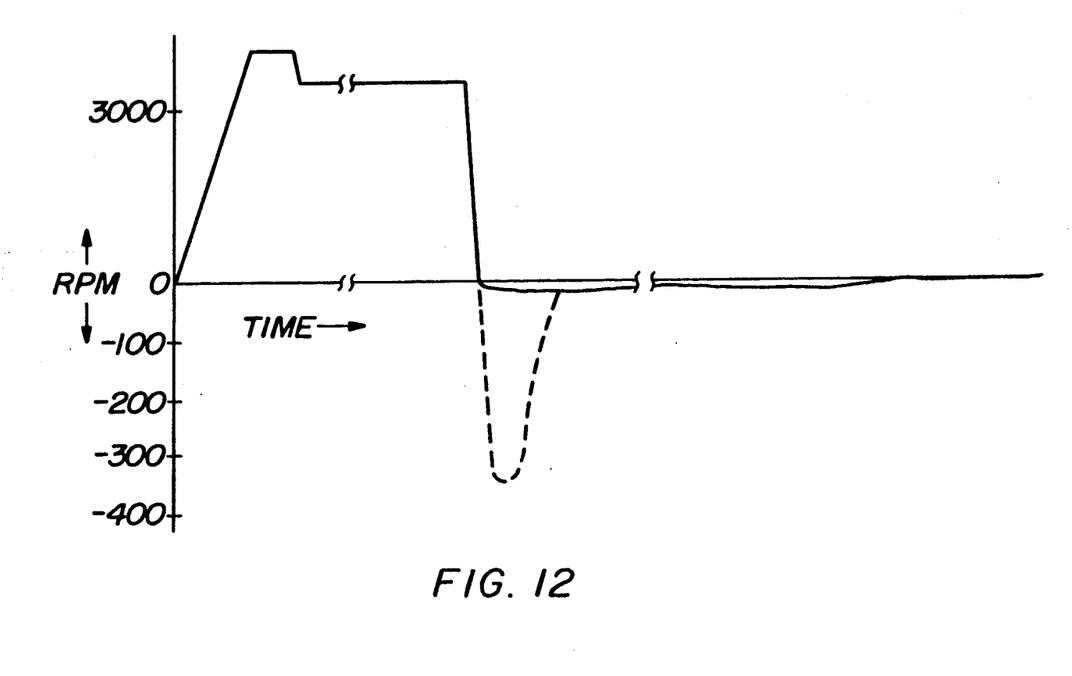
FIG. 12 is a plot of motor revolutions versus time.

Based upon the above description and to graphically show the operation of the compressor the present invention, reference is made to FIG. 12 which shows a typical rotational curve plotted over time for a prior art compressor (dashed lines) and a compressor of the present invention (solid line).

In FIG. 12, both the prior art and present invention compressor increase to a surge speed at start up and then stabilize at a running rpm which is typically 3600 rpm. At stopping, both the compressors of the prior art and the present invention suddenly drop in rpms to 0; however, the prior art compressor does not stop at 0 rpm and begins reverse rotation to a relatively high rpm, typically 350 rpm. After some time period, typically 1 to 2 seconds the prior art compressor will slow its reverse rotation and stabilize at 0 rpm. In contrast to the prior art compressor, the compressor of the present invention is prevented from achieving high reverse rpm and is limited to some set value of reverse rotation (typically 10 rpm) by the braking control. The reverse rotation is then reduced to 0 rpm by the braking control over some time period, typically 30 to 120 seconds.

The present embodiment constructed as mentioned above is advantageous in that the entire system can be drastically miniaturized in comparison with the conventional system, the starting torque is substantially improved and an adverse influence of a differential pressure possibly developed during the restarting is negligible, since this embodiment employs the brushless DC motor as the electromotor section. Adoption of the scroll type compressor provides further advantages of this embodiment, because the scroll type compressor is intrincically free from vibration generating factors such as variation of compressive torque. Specifically, such nature of the scroll type compressor makes it possible to start the system further smoothly than in the system of prior art, and makes it unnecessary to provide separate vibration suppressing elements, for example, vibration-proof material, thick wall casings, etc. as the prior art has conventionally required, not only for the scroll type compressor itself but also for the system as a whole. Furthermore, various controls are facilitated by adoption of the Hall elements for detection of magnet position.

Figure 4:
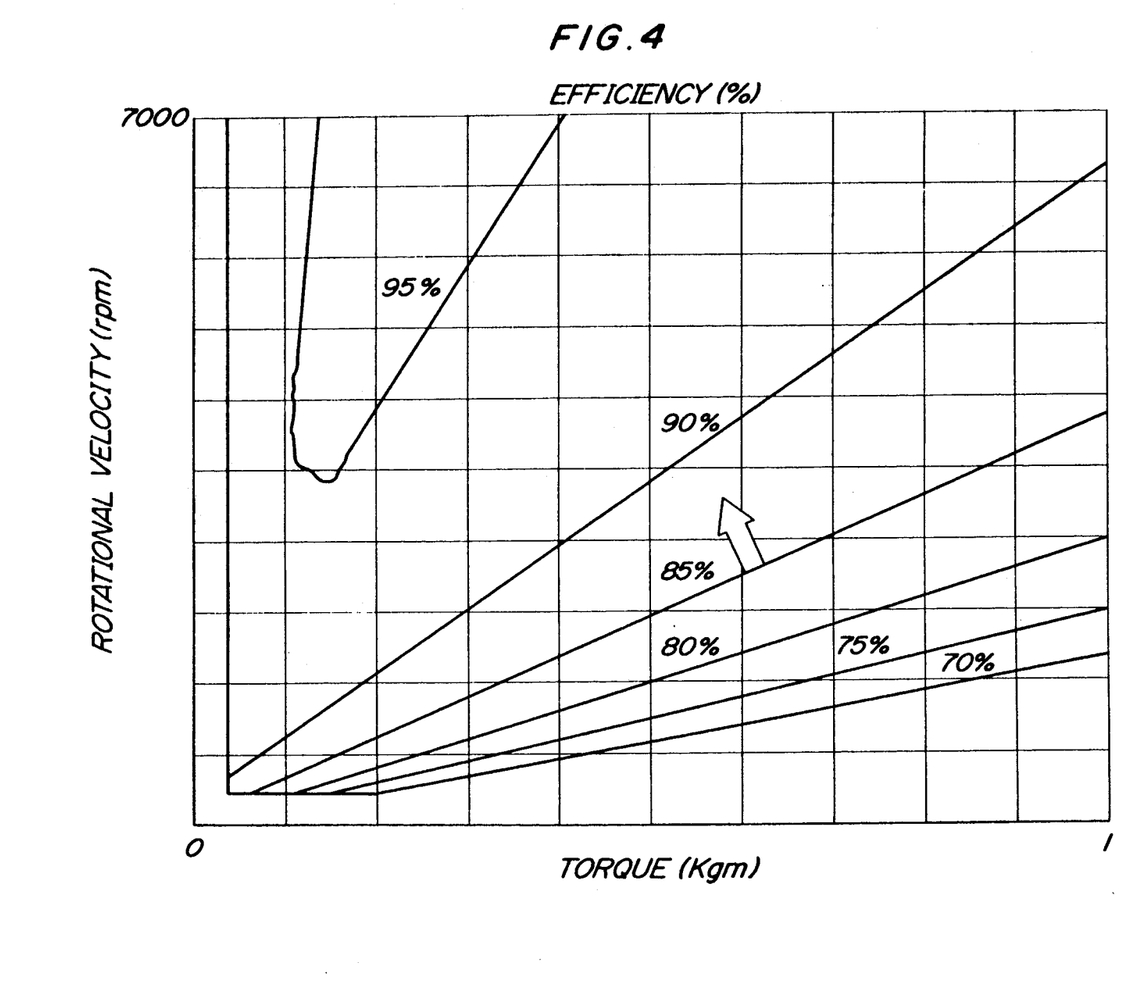
FIG. 4 is an isoefficiency graphic diagram of the electromotor during its pulse modulation driving.

In addition, the magnetic performance of the permanent magnets forming a part of the rotor is improved in this embodiment and thereby the driving efficiency of the electromotor is correspondingly improved, as will be apparent from FIG. 4 which is an iso-efficiency graphic diagram plotting the efficiency characteristic of the electromotor section in the enclosed motor compressor of the present invention. As seen, the stablized high efficiency is maintained even as the r.p.m. and the compressive torque change. In the operating range of the r.p.m. from 0 to 7000 r.p.m. and the motor output torque from 0 to 1 Kgm, 60% or wider portion of this operating range is occupied by the extent in which the motor output efficiency is 85% or higher.

Figure 5:
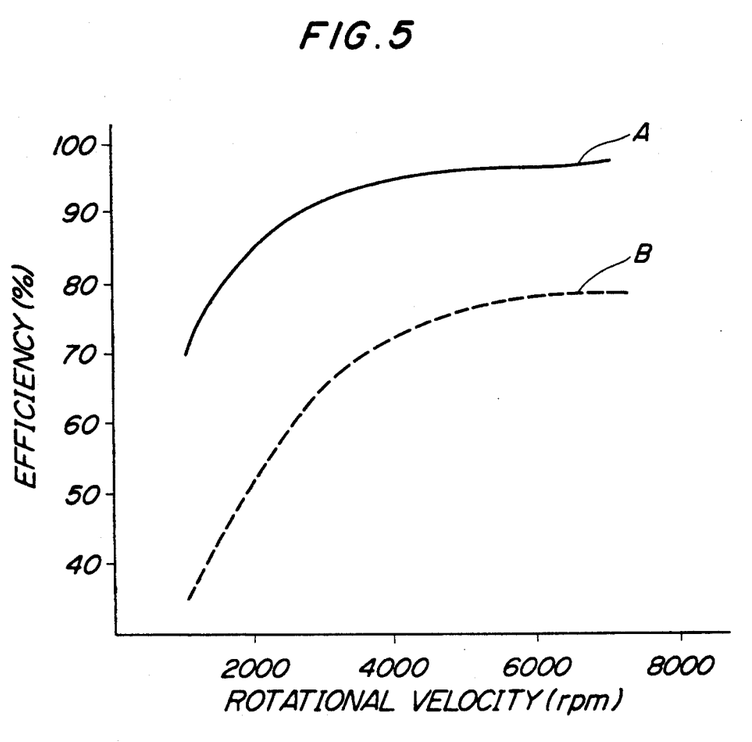
FIG. 5 is a graphic diagram plotting the rotational velocity versus the efficiency of the compressor.

According to this embodiment, such brushless DC motor 7 was combined with the scroll type compressor 1, resulting in that the efficiency of the compressor itself in a range of high velocity rotation was also improved, as shown by FIG. 5 which plots the r.p.m. versus the efficiency in the enclosed motor comporessor (characteristic B) comprising the reciprocating type compressor of prior art combined with the induction motor and the enclosed motor compressor (characteristic A) of the present invention. As will be apparent from FIG. 5, the efficiency was improved over the system of prior art over all the operating range, since, according to the present embodiment, the advantages intrinsic to the scroll type compressor is multiplied by the advantages of the brushless DC motor.

It should be understood that the Hall elements serving as the position sensor may be replaced by MR elements or photo-sensitive elements, or the coil current may be superimposed with high frequency to detect the relative position of such sensor and the magnetic poles. It is also possible to position-detect the magnetic poles and then to make the driving control by use of the back feeding voltage of the coils so far as an appropriate countermeasure is taken to assure a smooth starting.

This embodiment employs the brushless DC motor as the electro-motor to drive the compressor and provide the braking circuit to block the rotor against further rotation after the rotor has ceased to be driven. In this way, the reverse rotation of the rotor possibly occurring after the rotor has ceased to be driven can be prevented in the electric manner, making it possible to avoid discomfortable noise generated by the compressor as well as deterioration of the durability both due to said reverse rotation. Finally, the non-return valve which has conventionally been required to be incorporated can be eliminated in this embodiment. This advantageously decreases the coolant flow resistance but increases the volume efficiency during high velocity driving of the compressor, thus improving the general performance of the system.

Then, a second embodiment of the permanent magnets forming a part of the rotor will be discussed.

In this embodiment, magnet powder having a composition (% by atomic weight) of $Nd_{27}Fe_{68}Co_4B_1$ and particle sizes of 1μm to 120μm was mixed with epoxy resin at a ratio of 98.5:1.5% by weight to obtain a magnet composition which was then kneaded and granulated. This granulated composition was subjected to compression molding in a metal mold and then thermoset to obtain a rotor permanent magnet 11 of a predetermined shape. The magnet thus obtained exhibited an excellent magnetic performance as shown by Table 2.

TABLE 2

| (BH)max(MGOe) | bHc(KOe) | Br(KG) |
|---|---|---|
| 8.9 | 5.3 | 6.6 |

Also corrosion resistance and best resistance of neodymium-iron-boron system which would otherwise be poor for such particular application were improved by process of resin-bonding to a necessary and satisfactory value.

Then, a third embodiment of the rotor permanent magnet will be discussed.

In this embodiment, said permanent magnet 11 of the rotor 9 comprises a rare earth permanent magnet substantially made of R (at least one of rare earth elements inclusive of Y), transition metal and boron, and was formed by a process as will be described from an alloy composition shown in Table 3.

TABLE 3

| Composition | $Pr_{17}Fe_{76.5}Gu_{1.5}B_5$ |
| --- | --- |

Figure 6:
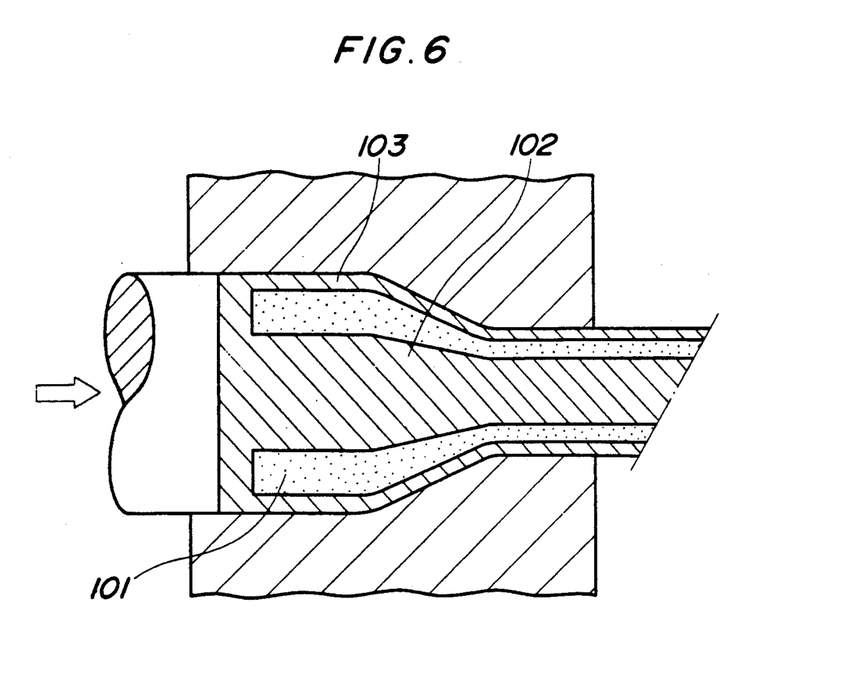
FIG. 6 is a schematic sectional view of an extruder.

To form a rotor a, rare earth, transition metal and boron were properly weighed, then the mixture was molten in an induction furnace, and cast into an ingot. The ingot thus cast was ground to an average particle diameter of 5μm (by Fischer's subsieve sizer), then mixed with Freon gas, and preliminarily molded into a ring-shaped wet magnet having outer diamter of 100mm, inner diameter of 40mm and thickness of 30mm.

Figure 7:
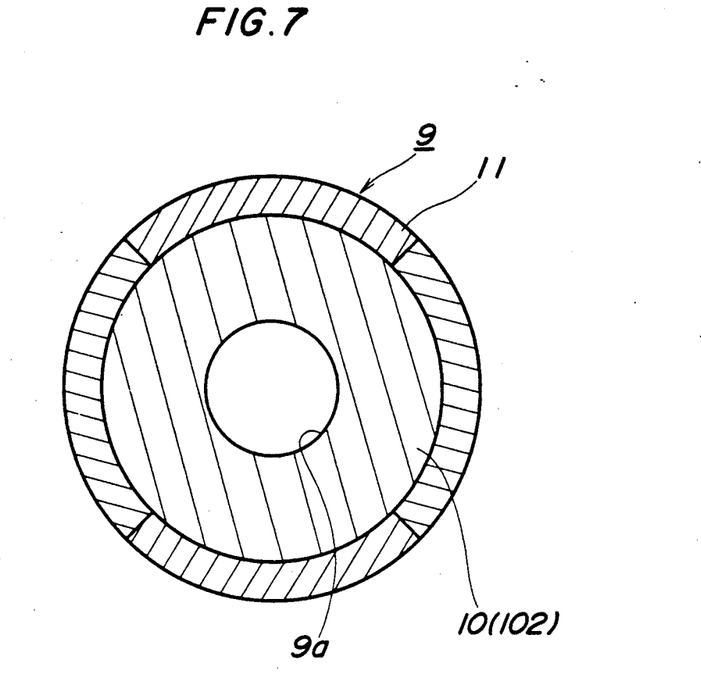
FIG. 7 is a cross-sectional view of an extruded rotor.

Then, a cylinder 102 of soft magnetic material such as pure iron was placed inside of said wet magnet 101 and 200mm thick pipe 103 of sus304 having its inner surface coated with boron nitride was put on the outside of said wet magnet 101. Thereafter, this assembly was deaerated, closed at opposite ends and pressed by an extruder as indicated in FIG. 6 until the pipe 103 has its thickness reduced to 10% of the initial thickness. The assembly was then subjected to a heat treatment at a temperature of 1000° C. for 24 hours and, after removal of the pipe 103, the cylinder 102 of soft magnetic material, i.e., the yoke 10 was centrally provided, as illustrated by FIG. 7, with an insertion opening 9a into which the driving shaft 8 was fixedly fit to obtain the rotor 9.

It should be noted that the composition of the magnet is not limited to the particular composition as set forth in Table 3 and at least one or a combination of two or more elements may be selected as the rare earth metal from a group including Y, La, Ce, Pr, Nd, Sm, Eu, Gd, Tb, Dy, Ho, Er, Tm, Yb and Lu. The highest magnetic characteristic is presented by Pr. As the transition metal, at least one or a combination of two or more elements may be selected from a group including Fe, Ni and Cu. It should be noted also that a small quantity of additive elements such as some heavy rare earth, for example, Dy and Tb, and Al, Si, Mo, Ga, In, Ag and Au is effective to improve a coercive force.

In case of this embodiment, the rotor 9 obtained by the process as has been mentioned above exhibited a magnetic performance as set forth below in Table 4.

TABLE 4

| Direction | (BH)max(MGOe) | iHc(KOe) |
| --- | --- | --- |
| r | 20.5 | 10.5 |
| u | 20.5 | 10.5 |
| z | 5.0 | 5.0 |

As will be apparent from Table 4, such permanent magnet 11 is an intraface anisotropic magnet that intrinsically exhibits high magnetic performance particularly in the r-direction (radial direction) and the u-direction (circumferential direction). Owing to hot working in an atmosphere at a temperature of 900° C., this permanent magnet was solid-state joined to the soft magnetic body which had been worked together with the permanent magnet and no separation occurred between these two components even during the high velocity rotation. Said soft magnetic body serves also as a reinforcing material for the magnet. Strength of the magnet itself was also improved over the conventional ferrite magnet.

The high magnetic performance as shown by Table 2 allowed the amount of material to be reduced and the magnet itself to be correspondingly miniaturized and weight-reduced. As a result, a centrifugal force exerted on the magnet was sufficiently reduced to realize a rotor reliably operating even during the high velocity rotation. Thus, the present embodiment of the rotor magnet is adequately adaptable for high velocity rotation of the scroll type compressor and effectively contributed to miniaturization and weight-reduction of the compressor as a whole.

Now a fourth embodiment of the rotor will be explained in reference with FIG. 8.

According to the present embodiment, the rotor 9 comprises the magnet 11 molded integrally with the yoke 10 by a process as will be described below.

After melting a mixture of ingredients in an induction furnace and then casting so as to result in the composition of Table 3, the ingot thus obtained was ground to an average particle diameter of 5μm (by Fischer's subsieve sizer) and molded in a graphite mold into a magnet having outer diameter of 60mm and height of 40mm.

Figure 8:
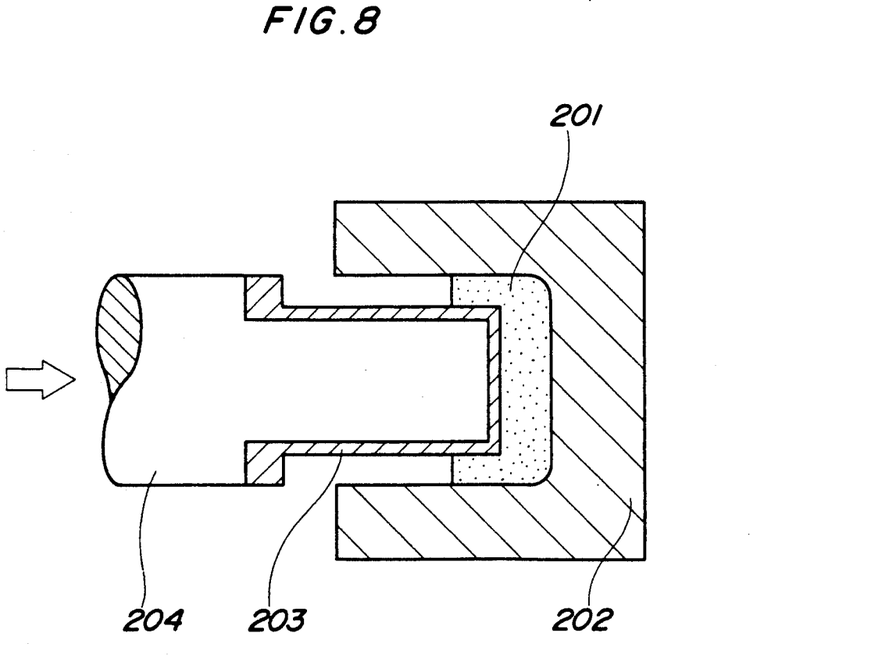
FIG. 8 is a schematic sectional view illustrating a rear extruder in connection with a fourth embodiment of the present invention.

Then, utilizing a rearward extruder as illustrated in FIG. 8, said molded magnet 201 was placed in a mold 202 and a mandrel 204 having outer diameter of 52mm and provided around its front end with a flanged shell 203 was pushed in the direction as indicated by an arrow in Ar-atmosphere at a temperature of 900° C. and thereby the molded magnet 201 was extruded in the direction opposed to said direction indicated by the arrow in which the mandrel 204 was pushed, i.e., rearwards to provide a radially orientated ring-shaped magnet. This rearward extrusion was performed so that a ratio of the cross-sectional area before the extruding process to the cross-sectional area after the extruding process of the magnet should be approximately 4. Then, the magnet/shell subassembly was removed from the mandrel, and after a front end portion of the subassembly was cut off, this magnet/ shell subassembly was directly clamped on the driving shaft 8. Clamping may be achieved by so-called force-fit or by screw-clamping the subassembly through the flange portion on the driving shaft.

In accordance with this embodiment, the magnet itself was solid-state bonded to the yoke with a cohesive force sufficient to accommodate a centrifugal force developed during the high velocity rotation of the motor, since the rotor 9 was formed by the hot working in the Ar-atmosphere at a temperature of 900° C. Magnetic measurement which was conducted with respect to r-direction (i.e., radial direction), u-direction (i.e., circumferential direction) and z-direction (i.e., axial direction) of the rotor 9 indicates, as seen in Table 4, that the present embodiment provides a rotor which exhibits the highest magnetic performance in the r-direction and has been radiallly orientated by the rearward extrusion.

TABLE 5

| Direction | (BH)max(MGOe) | iHc(KOe) |
| --- | --- | --- |
| r | 30.5 | 12.5 |
| u | 5.3 | 6.3 |
| z | 3.5 | 5.0 |

Furthermore, this embodiment of the rotor allowed its construction to be simplified by configuring said flange portion so as to serve also as a member which compensates undesirable unbalance due to the eccentricity of the movable scroll member.

Then, a fifth embodiment of the rotor will be discussed.

Figure 9:
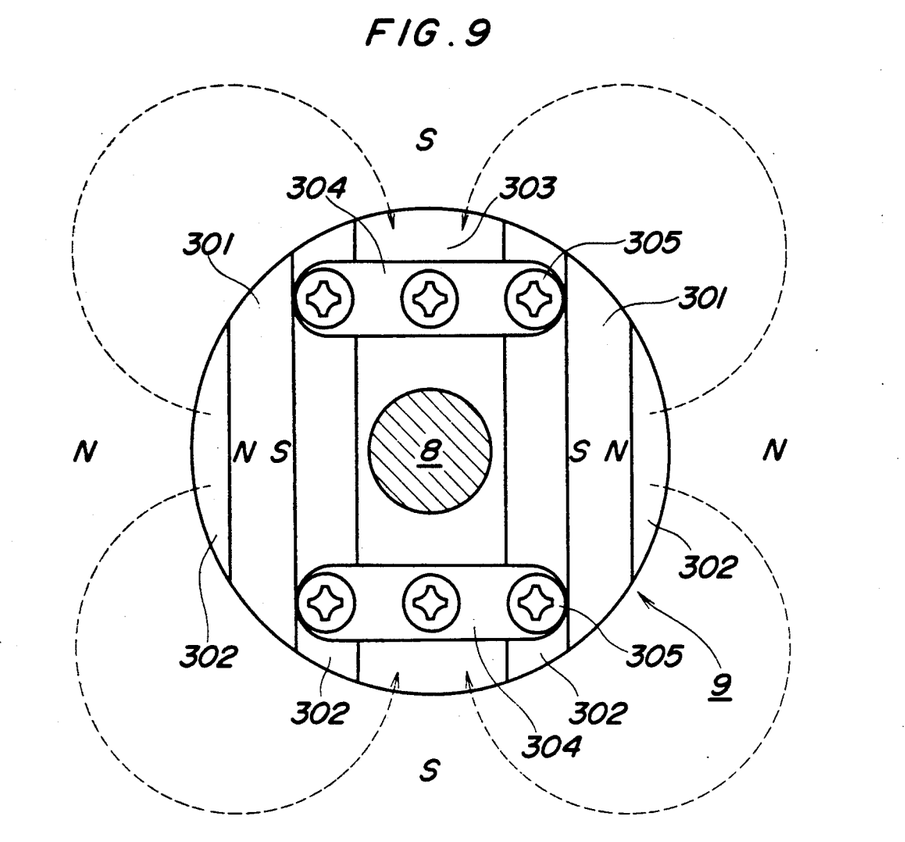
FIG. 9 is a side view of a rotor.

According to the present embodiment, the rotor 9 was constructed as shown by FIG. 9 which is a side view as viewed in the axial direction. Referring to FIG. 9, reference numeral 301 designates permanent magnets substantially made of rare earth, transition metal and boron, 302 main yokes solid-state bonded by the hot working to the permanent magnets, and 303 an auxiliary yoke. The main yokes 302 and the auxiliary yoke 303 were clamped together by a tie-plate 304 and setscrews 305. The driving shaft 8 was incorporated by force-fitting it into the insertion opening of the auxliary yoke 303. The permanent magnets 301 were arranged so that their S-poles are diametrically opposed to each other. Accordingly, the entire rotor 9 comprises a 4-pole rotor in which, as seen in FIG. 9, the circumferential portions of the auxiliary yoke 303 and the main yokes 302 immediately adjacent the auxiliary yoke 303 define the S-poles while the main yokes 302 immediately adjacent the N-pole sides of the respective permanent magnets 301 define the N-poles.

Such rotor 9 was formed in a manner as will be mentioned.

Figure 10:
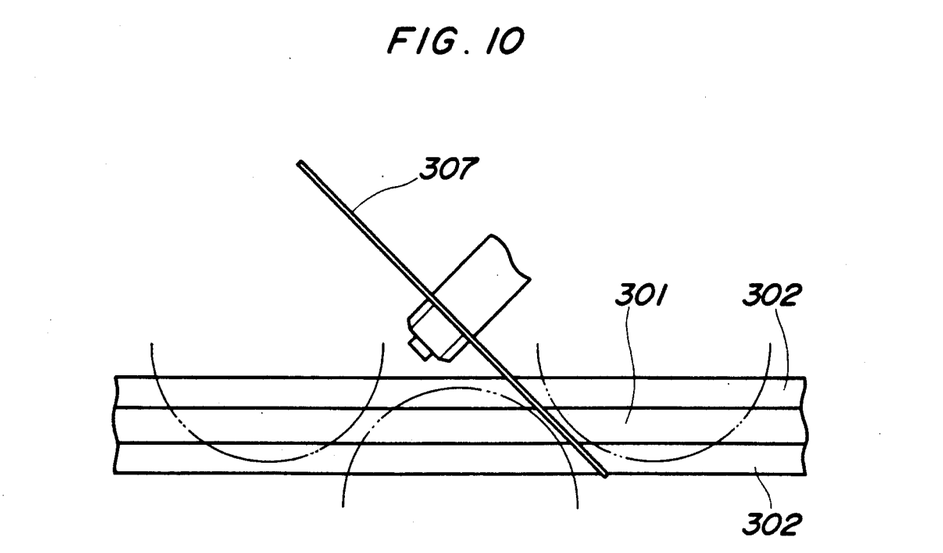
FIG. 10 is a schematic illustration of a solid state assembly of a permanent magnet and a main yoke.

The magnet alloy of the composition as in the first embodiment was molten, then cast in a mold of soft magnetic material such as pure iron, cooled, thereafter hot-worked at a temperature of 950° C., and finally subjected to a heat treatment to obtain a solid-state bonded subassembly of the permanent magnet 301 and the main yoke 302 as illustrated by FIG. 10. The permanent magnet 301 exhibited a magnetic performance as set forth in Table 6.

TABLE 6

| iHc | Br | (BH)max |
|---|---|---|
| 9.5 | 10.3 | 30.0 |

The solid-state bonded subassembly was cut by a slicer 307 into trapezoidal pieces and the main yokes 302 to be disposed adjacent the driving shaft 8 were provided with threaded holes. Then, said subassembly was assembled by the tie-plates 304 with the auxiliary yoke 303 including the driving shaft 8 force-fit thereinto. Then, this assembly was ground to a desired diameter and magnetically impressed by repulsive field to obtain the rotor 9.

Although the magnet was subjected to a hot rolling together with the mold in this embodiment, it is possible to obtain a magnet having the equivalent performance also when the ingot is placed in a sheath of soft magnetic material and then subjected to the hot working.

Finally, a sixth embodiment of the rotor will be described.

Utilizing a vacuum melt spinning equipment usually used to make amorphous alloy, a quenched slice having a thickness in order of 30 m was obtained from an alloy of a composition as indicated in Table 7. This slice was hot-pressed, bulked, and then subjected to the rearward extrusion to obtain a rotor comprising a radially oriented permanent magnet solid-state bonded to a yoke.

TABLE 7

| Composition | $Nd_{15}Fe_{77}B_8$ |
|---|---|

As will be apparent from the aforegoing description, the present invention adopts a scroll type compressor, thereby providing the compressor which is of a small torque variation and maintains a high efficiency even during a high velocity rotation, on one hand, and employs a brushless DC motor having its rotor comprising permanent magnets each substantially made of rare earth, transition metal and boron, thereby achieving a high magnetic performance which, in turn, allows the electromotor section to be miniaturized as well as allows the strength to be improved. The present invention thereby protects the rotor against a rupture thereof due to a centrifugal force developed during its rotation and permits the rotor to be reliably rotated even at a high velocity, eliminating the non-return valve which has conventionally been required to be incorporated in the system of prior art and thereby improving the general performance of the entire system. The present invention combines the scroll type compressor with the brushless DC motor both of which have respective advantages intrinsic to them, and thereby compatibly achieves the miniaturization, the smooth restarting and the high velocity operation.

What is claimed is:

1. An air conditioner having a compressor and a brushless DC motor directly coupled to a driving shaft of said compressor, wherein said compressor comprises a scroll type compressor; and a rotor of said brushless DC motor comprises a permanent magnet essentially composed of rare earth elements inclusive of yttrium, transition metal and boron; and further comprising a detecting means for sensing reverse rotation of said rotor, a means for presetting a reverse rotation amount and a means for applying a braking force to said motor by exciting coils of said motor such that a high braking force is applied if the sensed rotation is greater than said preset reverse rotation amount and said braking force is decreased as said sensed reverse rotation is less than said preset reverse rotation amount until said sensed reverse rotation becomes zero.

2. An air conditioner as recited in claim 1, wherein the permanent magnet carried by the rotor of said electromotor is made of a magnetic composition comprising magnet powder having a composition $Nd_{14}Fe_{76}Co_4B_6\%$ by atomic weight and a particle diameter of 1μm to 44μm and epoxy resin.

3. An air conditioner as recited in claim 1, wherein the rotor of said electromotor is made of magnet which is an alloy containing rare earth-iron-boron, Pr-Fe-Cu-B or Nd-Fe-B that is processed by hot working and anisotiropicized.

4. An air conditioner as recited in claim 1, wherein the permanent magnet carried by the rotor of said electromotor is made of a magnet which is an alloy having a composition $Pr_{17}Fe_{76.5}Cu_{1.5}B_5\%$ or $Nd_{15}Fe_{77}B_8\%$ by atomic weight which is processed by hot working and anisotiropicized.

5. An air conditioner as recited in claim 1, 2 or 3, wherein the permanent magnet carried by the rotor of said electromotor comprises an integral, cylindrical, radially orientated magnet.

* * * * *

UNITED STATES PATENT AND TRADEMARK OFFICE
CERTIFICATE OF CORRECTION

PATENT NO. : 5,006,045
DATED : April 9, 1991
INVENTOR(S) : TATSUYA SHIMODA, et al.

It is certified that error appears in the above-identified patent and that said Letters Patent is hereby corrected as shown below: Title page:

Enter--[30] Foreign Application Priority Data
    Dec. 24, 1987 [JP] Japan ....... 62-327798
    Nov. 8, 1988 [JP] Japan ....... 63-280301
    Nov. 8, 1988 [JP] Japan ....... 63-280302 --

Signed and Sealed this

Tenth Day of November, 1992

Attest:

DOUGLAS B. COMER

*Attesting Officer*      *Acting Commissioner of Patents and Trademarks*